United States Patent Office 2,741,655
Patented Apr. 10, 1956

2,741,655
CUPRIFEROUS AZO-DYESTUFFS

Henri Riat, Arlesheim, and Fritz Oesterlein, Basel, Switzerland, assignors to Ciba Limited, Basel, Switzerland, a Swiss firm No Drawing. Application November 3, 1952,
Serial No. 318,508

Claims priority, application Switzerland
November 12, 1951

1 Claim. (Cl. 260—148)

This invention provides azo-dyestuffs of the general formula

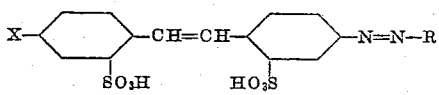

in which X represents a hydrogen or a halogen atom, and R represents a radical derived from an azo-component. These dyestuffs include, for example, disazo- and polyazo-dyestuffs, which are made from azo dyestuffs obtainable from diazotized 4-aminostilbene-2:2'-disulfonic acid or diazotized 4-amino-4'-halogen-stilbene-2:2'-disulfonic acids and azo-components by further linking reactions and/or by treatment with an agent yielding metal. As an example of such a product there may be mentioned the cupriferous dyestuff of the formula

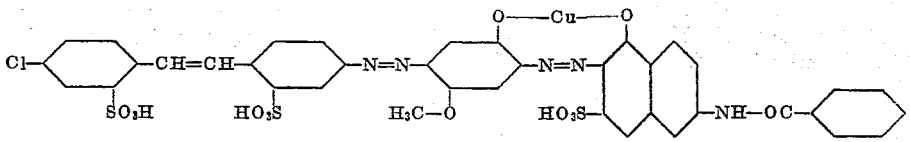

The dyestuffs of the Formula 1 can be made, if desired in combination with further linking reactions, by coupling diazo-compounds with azo-components, and using as diazo components 4-aminostilbene-2:2'-disulfonic acids which in the 4'-position may be free from substituents or contain a halogen atom as a substituent, and if desired treating the resulting dyestuffs with an agent yielding metal, provided they contain a metallizable group.

The diazo components of the formula (2) 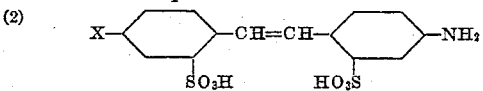

used as staring materials, in which X represents a hydrogen or a halogen atom, can be made by diazotizing 4-nitro-4'-aminostibene-2:2'-disulfonic acid, replacing the diazo-group by a hydrogen atom or a halogen atom, and reducing the nitro group to an amino group by methods in themselves known. 4-amino-4'-chlorostilbene-2:2'-disulfonic acid is an especially valuable compound easily obtainable in this manner.

Valuable disazo-dyestuffs are obtained by the present process, for example, by using a compound of the Formula 2 as initial component, a middle component which contains a group capable of forming metal complexes in a position vicinal to an amino group, and an end component capable of coupling in ortho-position to a hydroxyl group, and, if desired, treating the resulting disazo-dyestuff with an agent yielding copper. As middle components for this purpose there come into consideration above all amines of the naphthalene and benzene series capable of coupling, which contain in a position vicinal to the amino group an alkoxy group, advantageously a methoxy group, thus, for example, 1-amino-2-methoxynaphthalene, 1-amino-2-methoxybenzene, 1-amino-2-methoxy-5-methylbenzene and 1-amino-2:5-dimethoxybenzene. Especially valuable disazo-dyestuffs are obtained by using as a middle component 1-amino-2-methoxy- or -ethoxy-naphthalene-6- or -sulfonic acid. As end components there may be used with advantage hydroxynaphthalene sulfonic acids, and among these there are especially valuable amino-hydroxynaphthalene sulfonic acids substituted at the nitrogen, for example, 2-acylamino- or 2-arylamino-5-hydroxynaphthalene-7-sulfonic acids, or 2-amino-8-hydroxynaphthalene-6-sulfonic acids or 1-amino-8-hydroxynaphthalene-3:6-disulfonic acids also substituted at the nitrogen.

Thus, for example, with the use of 4-amino-4'-chlorostilbene-2:2'-disulfonic acid as initial component, an ortho-amino-alkoxybenzene such as 1-amino-2-methoxy-5-methylbenzene, 1-amino-2:5-dimethoxybenzene or 1-amino-2-methoxynaphthalene-7-sulfonic acid as middle component, and a 2-arylamino- or 2-acylamino-5-hydroxynaphthalene-7-sulfonic acid such as 2-phenylamino- or 2-(4'-carboxymethyl-phenylamino)- or 2-benzoylamino- or 2-(4'-chlorobenzoylamino)-5-hydroxynaphthalene-7-sulfonic acid as end component there are obtained disazo-dyestuffs of which the complex copper compounds obtainable by coppering accompanied by demethylation yield dyeings of especially good fastness to light on cellulose fibers.

Very valuable dyestuffs which are distinguished above all by the purity of the tints of their dyeings and by the very good capacity of their dyeings for being discharged, are obtained by diazotizing a compound of the Formula 2 advantageously 4-amino-4'-chlorostilbene-2:2'-disulfonic acid, coupling the diazo compound with a 1-amino-2-alkoxynaphthalene sulfonic acid, for example, 1-amino-2-methoxynaphthalene-6-sulfonic acid, further diazotizing the amino-azo-dyestuff, and coupling it with a 1-acylamino-8-hydroxynaphthalene-3:6-disulfonic acid such as 1-benzoylamino-8-hydroxynaphthalene-3:6-disulfonic acid.

From the diazo components of the Formula 2 further valuable dyestuffs can be made by using as an azo component a compound containing an —NH2 group, for example, a middle component of the benzene series mentioned above, and reacting the amino-azo-dyestuff so obtained with an amino-azo-dyestuff of the same or a similar kind with the aid of a compound containing two reactive halogen atoms. As examples of compounds containing reactive halogen atoms there may be mentioned cyanuric chloride, 2:4-dichloroquinazoline and especially phosgene. In the case of dyestuffs obtained from cyanuric chloride the remaining (third) reactive chlorine atom is advantageously exchanged in known manner for an —OH group or an —NH2 group or the radical of a simple aromatic amine, for example, a phenylamino group.

Valuable dyestuffs are also obtained by coupling 2 molecular proportions of a diazo compound of an amine of the Formula 2 with 1 molecular proportion of a compound of the formula (3) 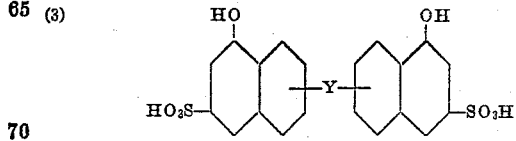

in which Y represents a nitrogen-containing bridge member bound on each side to a β-carbon atom of the naphthalene nuclei, such, for example, as a triazine radical or advantageously a —NH— or —NH—CO—NH— group. As examples of compounds of the Formula 3 there may be mentioned: 8:8-dihydroxy-2:2-dinaphthylamine - 6:6' - disulfonic acid, 8:8' - dihydroxy -2:2' - dinaphthyl - urea - 6:6' - disulfonic acid, 5:5' - dihydroxy-2:2'-dinaphthylamine-7:7'-disulfonic acid and 5:5'- dihydroxy-2:2'-dinaphthyl-urea-7:7'-disulfonic acid.

The reactions necessary in carrrying out the present process can be brought about by known methods familiar to the expert. Thus, for example, couplings with the middle components are advantageously carried out in an acid to neutral medium, and couplings with hydroxynaphthalene sulfonic acids, to which belong the compounds of the Formula 3, are advantageously carried out in an alkaline medium.

As agents yielding metal there come into consideration, for example, agents yielding nickel and above all those yielding copper. The treatment with an agent yielding metal, especially copper, can be carried out by one of the usual methods. When ortho:ortho'-dihydroxy-azo-copper complexes are to be made it must be realized that coppering with ortho:ortho'-dihydroxy-azo-groups takes place more easily than coppering with ortho-dihydroxy-ortho'-alkoxy-azo-groups with the splitting off of alkyl groups, and that therefore in the latter case a longer period of treatment and/or treatment at a higher temperature is indicated. The coppering can in many cases be carried out, for example, with salts of divalent copper in a weakly acid aqueous medium. However, the dyestuffs may also be coppered by methods in themselves known in which copper tetramine complexes are used in the presence or absence of an excess of an amine or ammonia, the coppering being carried out in an aqueous medium for several hours in the vicinity of 100° C. Especially valuable in some cases is the process in which coppering is carried out in the presence of a hydroxyalkylamine, especially ethanolamine, or a copper complex derived therefrom.

With regard to the formulae of the cupriferous dyestuffs it must be explained that the formulae undoubtedly show the correct stoichiometric quantities of copper and the correct positions of the copper atoms in the complex, but the distribution of main and secondary valences in the complex union has not been established with certainty.

The new dyestuffs corresponding to the general Formula 1 above can be used for dyeing or printing a very wide variety of materials such as wool, silk, leather and especially cellulose fibers, such as cotton, linen and artificial silk and staple fibers of regenerated cellulose. There are obtained dyeings which are distinguished by their especially interesting tints and in some cases, especially when the dyestuffs are complex copper compounds, by unexpectedly good properties of fastness. When the dyestuffs contain groups capable of forming metal complexes and have not already been metallized in substance, they may be treated by known methods on the fiber or in the dyebath with agents yielding metal, and especially agents yielding copper. This method of metallization is especially recommended in the case of dyestuffs containing only a few groups imparting solubility and their metal complexes are therefore insufficiently soluble for dyeing by the usual direct dyeing processes.

The following examples illustrate the invention, the parts and percentages being by weight:

*Example 1*

38.9 parts of 4-amino-4'-chlorostilbene-2:2'-disulfonic acid are dissolved in 150 parts of water, then mixed with 25 parts of hydrochloric acid of 30 per cent. strength, and diazotized with 6.9 parts of sodium nitrite in 50 parts of water. To the diazo compound is added a hydrochloric acid solution of 15.3 parts of 1-amino-2:5-dimethoxybenzene. By the addition of sodium acetate until the reaction is neutral to Congo and stirring overnight the monoazo-dyestuff is formed. The precipitated dyestuff is filtered off.

The moist dyestuff cake is dissolved in 1000 parts of water with the addition of sodium hydroxide, 6.9 parts of sodium nitrite in 50 parts of water are added, and 40 parts of hydrochloric acid of 30 per cent. strength are introduced rapidly while stirring well at 5–10° C. In 2–3 hours the diazotization is finished. The diazo compound is then introduced into a solution of 35 parts of 2-benzoylamino-5-hydroxynaphthalene-7-sulfonic acid, 200 parts of water and 40 parts of sodium carbonate and the whole is stirred for 10–12 hours. When the coupling is finished the disazo-dyestuff is salted out, filtered off, and conversion into the copper complex is brought about by boiling under reflux for 5 hours with 25 parts of crystalline copper sulfate, 50 parts of ammonia solution of 25 per cent. strength and 20 parts of ethanolamine in 2000 parts of water. The dyestuff is precipitated with sodium chloride, and filtered off and dried. It is a dark powder and dyes cotton green-grey tints of very good fastness to light.

By replacing the 1-amino-2:5-dimethoxybenzene by 1-amino-2-methoxy-5-methylbenzene, and otherwise proceeding in the manner described above there is obtained a dyestuff which dyes cotton grey-blue tints and which has the formula

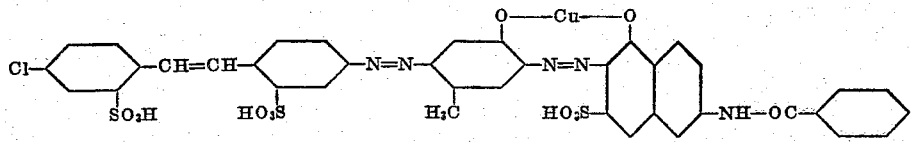

A dyestuff having similar properties is obtained by using as middle component 1-amino-2-methoxybenzene which is advantageously coupled in the form of its ω-methane sulfonic acid and the ω-methane sulfonic acid group is subsequently split off.

By using in this example as end component 2-(4'-carboxymethoxyphenylamino) - 5 - hydroxynaphthalene - 7-sulfonic acid, instead of 2-benzoylamino-5-hydroxynaphthalene-7-sulfonic acid, there is obtained a dyestuff which dyes cotton steel blue tints.

Another dyestuff also having similar properties is obtained by replacing the 1-amino-2:5-dimethoxybenzene by 1-amino-2-methoxybenzene and the 2-benzoylamino-5-hydroxynaphthalene-7-sulfonic acid by 2-acetylamino-5-hydroxynaphthalene-7-sulfonic acid. This dyestuff corresponds to the formula

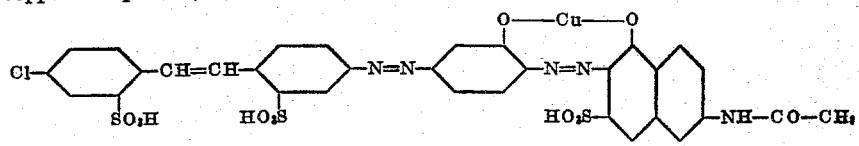

The 4-amino-4'-chlorostilbene-2:2'-disulfonic acid may be prepared as follows:

40 parts of 4-nitro-4'-aminostilbene-2:2'-disulfonic acid are dissolved in the form of the disodium salt in 200 parts of water, 7 parts of sodium nitrite in 30 parts of water are added and 40 parts of hydrochloric acid of 30 per cent. strength are rapidly introduced, and the whole is stirred for 2 hours at 10–15° C. The diazo compound is then introduced into a cuprous chloride solution at 60–70° C., prepared from 14 parts of cuprous chloride dissolved in 80 parts of hydrochloric acid of 30 per cent. strength. The reaction takes place immediately. By the addition of sodium chloride the 4-nitro-4'-chlorostilbene-2:2'-disulfonic acid is precipitated. The nitro compound is reduced by the Béchamp method, and 4-amino-4'-chlorostilbene-2:2'-disulfonic acid is precipitated from the mineral acid filtrate freed from iron, by the addition of sodium chloride, filtered and dried. It is a yellow powder.

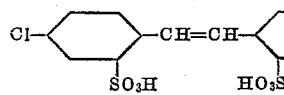

of sodium acetate in 2000 parts of water. The copper complex having the formula

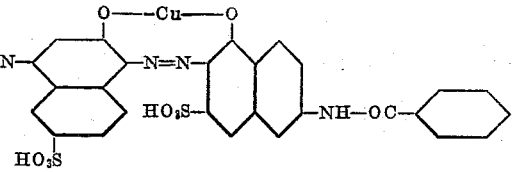

is precipitated with sodium chloride, filtered off, and converted into its sodium salt in known manner. The latter salt, after being dried, is a dark powder, which dyes cotton blue-green tints of excellent fastness to light.

By using, instead of 2-benzoylamino-5-hydroxynaphthalene-7-sulfonic acid, the corresponding quantity of 2-acetylamino-5-hydroxynaphthalene - 7 - sulfonic acid, there is obtained a dyestuff having similar properties.

Example 2

38.9 parts of 4-amino-4'-chlorostilbene-2:2'-disulfonic acid are dissolved in 150 parts of water, then mixed with 25 parts of hydrochloric acid of 30 per cent. strength, and diazotized at 0–5° C. with 6.9 parts of sodium nitrite dissolved in 50 parts of water. To the diazo compound is added a hydrochloric acid solution of 13.7 parts of 1-amino-2-methoxy-5-methylbenzene. By the addition of sodium acetate to produce a reaction neutral to Congo and stirring overnight, the dyestuff is formed. The precipitated dyestuff is filtered off.

The moist dyestuff cake is dissolved by the addition of sodium carbonate in 500 parts of water and converted into its urea-compound by introducing phosgene. After precipitating the dyestuff with sodium chloride it is filtered off and dried. It is a dark powder and dyes cotton orange-yellow tints.

Example 3

38.9 parts of 4-amino-4'-chlorostilbene-2:2'-disulfonic acid are dissolved in 150 parts of water then mixed with 25 parts of hydrochloric acid of 30 per cent. strength and diazotized at 0–5° C. with 6.9 parts of sodium nitrite in 50 parts of water, and the diazo compound is coupled with 25 parts of 5:5'-dihydroxy-2:2'-dinaphthylurea-7:7'-disulfonic acid, which is dissolved in the form of its sodium salt with 30 parts of sodium carbonate in 1000 parts of water. After stirring for about 12 hours the dyestuff formed is precipitated by the addition of sodium chloride, and it is filtered off and dried. It is a dark powder which dyes cotton pure red tints. The dyeings discharge very well.

Example 4

38.9 parts of 4-amino-4'-chlorostilbene-2:2'-disulfonic acid are dissolved in 150 parts of water and 11 parts of anhydrous sodium carbonate, the mixture is then acidified with 25 parts of hydrochloric acid of 30 per cent. strength and diazotized with 6.9 parts of sodium nitrite in 50 parts of water. After addition of the quantity of sodium bicarbonate necessary to turn Congo Red paper violet the diazo solution is coupled with 25.3 parts of 1-amino-2-methoxynaphthalene-6-sulfonic acid, which has been dissolved in the form of its sodium salt by means of 20 parts of crystalline sodium acetate in 200 parts of water. When the coupling is complete the disazo-dyestuff is rendered alkaline with sodium carbonate, salted out and filtered off. It is dissolved in 1000 parts of water, then mixed with 7 parts of sodium nitrite, and diazotized by the addition of 40 parts of hydrochloric acid of 30 per cent. strength. The whole is stirred for a further 2 hours at 15° C., and the diazo compound is introduced into a cold solution prepared from 35 parts of 2-benzoylamino-5-hydroxynaphthalene-7-sulfonic acid, 40 parts of sodium acetate and 100 parts of pyridine in 200 parts of water. When the coupling is finished the disazo-dyestuff is salted out, filtered off, and converted into its copper complex by boiling it under reflux for 5 hours with 25 parts of crystalline copper sulfate and 15 parts

Example 5

38.9 parts of 4-amino-4'-chlorostilbene-2:2'-disulfonic acid are dissolved in 150 parts of water, then mixed with 25 parts of hydrochloric acid of 30 per cent. strength, and diazotized with 6.9 parts of sodium nitrite in 50 parts of water at 0–5° C. The diazo compound is coupled with 25.3 parts of 1-amino-2-methoxynaphthalene-6-sulfonic acid, which has been dissolved in the form of its sodium salt in 1000 parts of water. By the addition of sodium acetate until the reaction is neutral to Congo Red paper and stirring the mixture for 10–12 hours, the dyestuff is formed. The precipitated dyestuff is then filtered off.

The moist dyestuff paste is dissolved in 1000 parts of water with the addition of sodium hydroxide, then 6.9 parts of sodium nitrite in 50 parts of water are added, and 40 parts of hydrochloric acid of 30 per cent. strength are introduced rapidly, while stirring well. The diazotization is complete in 2–3 hours. The diazo compound is then coupled with 42 parts of 1-benzoylamino-8-hydroxynaphthalene-3:6-disulfonic acid, which has been dissolved in the form of its sodium salt by means of 40 parts of sodium acetate.

By the addition of 10–15 parts of pyridine for every 100 parts by volume of the reaction mixture, and stirring the whole at 5–10° C. coupling is finished in 10–12 hours. By the addition of sodium chloride the dyestuff is precipitated and then filtered off. For purification it is reprecipitated. The dry dyestuff is a dark powder which dyes cotton pure green tints having a good capacity for being discharged.

Example 6

The diazo compound of the monoazo-dyestuff prepared as described in Example 2 from 38.9 parts of 4-amino-4'-chlorostilbene-2:2'-disulfonic acid and 13.7 parts of 1-amino-2-methoxy-5-methylbenzene is coupled in a solution rendered alkaline with sodium carbonate and in the presence of pyridine with 35.9 parts of 2-phenylamino-8-hydroxynaphthalene-6-sulfonic acid-3'-carboxylic acid. The disazo-dyestuff is isolated and converted into its copper complex as described in Example 1. The dyestuff dissolves in water with a green-grey coloration and dyes cotton green-grey tints.

Example 7

100 parts of cotton are entered at 40° C. into a dyebath which contains in 3000 parts of water 1 part of the dyestuff obtainable as described in the third paragraph of Example 1 and 2 parts of anhydrous sodium carbonate. Dyeing is carried on for one hour while the temperature is raised to 90° C., 30 parts of crystalline sodium sulfate are added, and dyeing is continued for a further ½ hour at 90–95° C. The cotton is then rinsed and finished in the usual manner. It is dyed grey-blue, and the dyeing is distinguished by very good fastness to light.

What we claim is:
The cupriferous azo-dyestuff of the formula
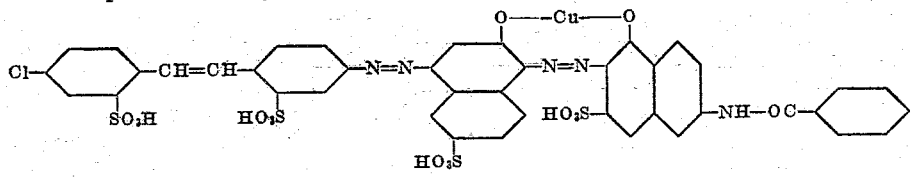
References Cited in the file of this patent
UNITED STATES PATENTS
2,551,056   Schetty ------------------ May 1, 1951
2,636,030   Keller ------------------- Apr. 21, 1953
OTHER REFERENCES
Georgievics et al.: Dye Chemistry, 1920, page 7.